Figure 1:
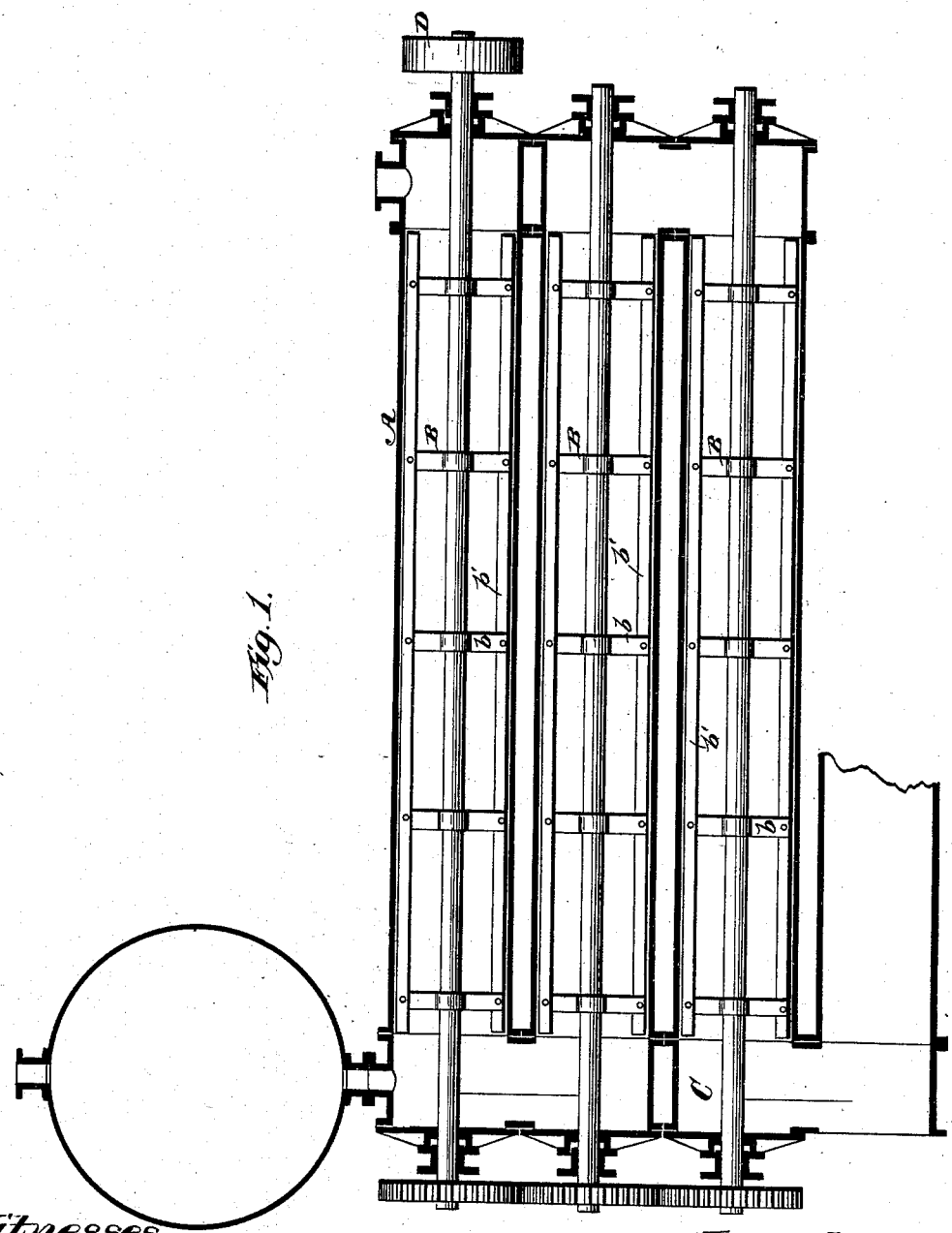

(No Model.) 2 Sheets—Sheet 2.

E. SOLVAY.
MANUFACTURE OF SODA.

No. 263,821. Patented Sept. 5, 1882.

Witnesses.
Robt Everitt
J A Rutherford

Inventor,
Ernest Solvay.
By James L. Norris.
Atty.

UNITED STATES PATENT OFFICE.

ERNEST SOLVAY, OF BRUSSELS, BELGIUM.

MANUFACTURE OF SODA.

SPECIFICATION forming part of Letters Patent No. 263,821, dated September 5, 1882.

Application filed May 27, 1882. (No model.) Patented in France May 14, 1881, No. 142,845; in Belgium May 14, 1881, No. 54,646; in England May 14, 1881, No. 2,113, and in Austria-Hungary January 4, 1882, No. 48,603 and No. 37,943.

*To all whom it may concern:*

Be it known that I, ERNEST SOLVAY, a Belgian subject, residing at Brussels, Belgium, have invented new and useful Improvements in the Manufacture of Soda, of which the following is a specification.

My invention relates to the manufacture of soda by the process generally known as the "ammonia process," for which Letters Patent were granted to me in the United States dated the 4th of March, 1873, and which process, as further improved by me, is described in the specification of Letters Patent granted to me, bearing date the 16th of October, 1877, and the 25th of December, 1877. In the manufacture of soda by the ammonia process (whether ordinary ammonia or compound ammonia be used in the said process) it is now well known that great difficulty is experienced in effecting the decomposition or calcination of the bicarbonate of soda obtained. Its tendency to become pasty, and also its being a bad conductor of heat, are the reasons why many calcining apparatus do not decompose the bicarbonate of soda as they should, or do not decompose the amount of bicarbonate they should decompose. By mixing a portion of calcined soda with the bicarbonate before effecting the decomposition of the said bicarbonate, as described in another application, I have been able to overcome the first of these difficulties. As regards the second difficulty, which is due to the material being a bad conductor of heat, I overcome it by bringing the bicarbonate of soda into such intimate contact with the heating medium that it may be said to be in molecular contact with it. For this purpose I violently agitate the bicarbonate of soda, so as to reduce it to dust or powder and to cause it to be constantly projected in every direction within the decomposing apparatus, the outer surface or sides of which are heated exteriorly either by furnaces or by high-pressure steam or otherwise. By this means the contact of the bicarbonate of soda with the heated sides of the apparatus is constantly renewed and the heat is rapidly and thoroughly diffused through the powdered bicarbonate of soda in the calcining-vessel. On the other hand, the agitation above described causes the material (bicarbonate of soda) to move forward in the contrary direction to that of its introduction, even in horizontal apparatus. I prefer to give to the apparatus a cylindrical form; but any other suitable form may be adopted.

The apparatus which I propose employing is illustrated in the annexed drawings, in which—

Figure 2:
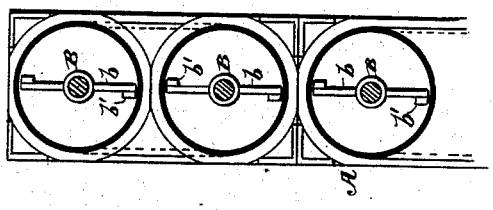
Figures 3, 4:
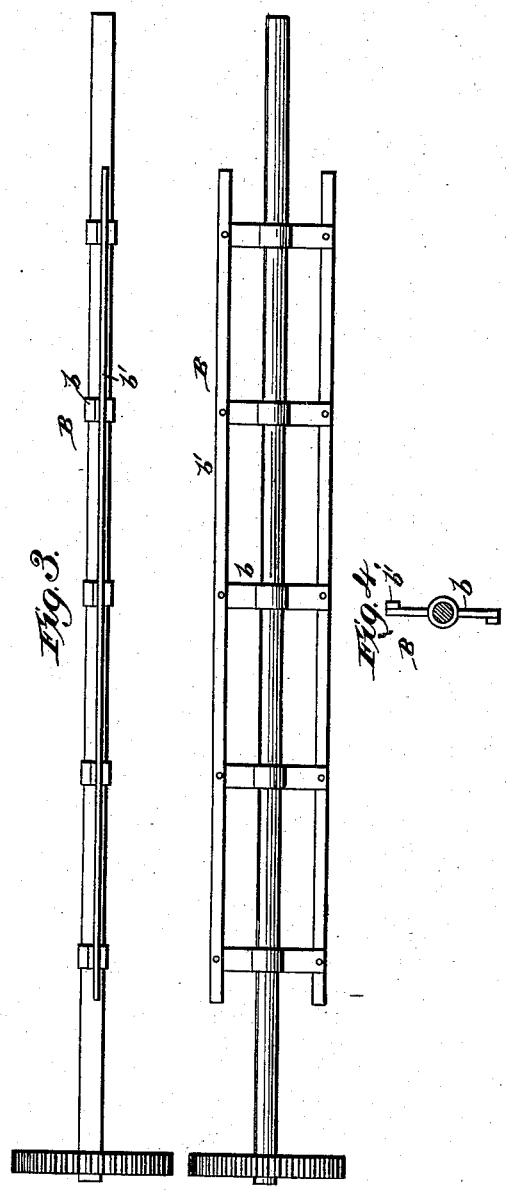

Figure 1 is a vertical longitudinal section. Fig. 2 represents a section taken through Fig. 1. Fig. 3 shows two of the rotary agitators with their gear-wheels. Fig. 4 is an end view of one of the rotary agitators.

This apparatus consists either of a long cylindrical tube, A, provided internally with a rotary agitator, B, running along the whole length of it; or several cylindrical tubes may be used, as shown, either one above the other or placed side by side and communicating one with the other at their ends, as at C, so that the length of one is added to the length of the others, as will be well understood by manufacturers. The shafts of these rotary agitators are provided with gear-wheels which mesh with each other, so that by driving one shaft by applying a driving-belt to a band-wheel, D, upon one of the shafts the remaining shafts will also be driven. The radial arms $b$ of the agitator are set at right angles to the shaft, and the ends of these arms are connected by slats or bars $b'$. Hence it will be seen that the material is not carried along the tube or cylinder by the agitator, as in other apparatus of this class, but is thrown around in the same and must find its way very slowly out of the end thereof, which will occur in a measure, but not owing to any propelling action of the agitator. The gases and vapors produced, and which are given off in the usual manner, carry away with them a portion of the powdered bicarbonate of soda. I free them from the said bicarbonate by causing them to pass by any suitable known means into a large-sized reservoir, where the bicarbonate is allowed to settle, and from whence it may be removed from time to time, either to be returned to the decomposing apparatus or for any other purpose.

Prior to my present application Patent No. 240,995, granted May 3, 1881, describes the bicarbonate of soda as being discharged into a heated iron cylinder and carried along the same and stirred by rotary segments and drivers. It will be perceived, however, that my invention contemplates projecting the dust in every direction within the heated vessel, so as to bring all of the particles of soda rapidly into intimate contact with the heated walls, thus attaining the desired results in a more rapid and effective manner.

The principle upon which are based all the continuous horizontal apparatus heated exteriorly—such, for example, as that shown in said patent—is that the material is to be made to advance regularly in a given direction on a surface heated underneath. The means adopted for carrying out this principle consist either in applying the greatest possible amount of heat to the surface or in having the greatest possible amount of heating-surface upon which the material is to rest. The top and sides of the apparatus, if they be heated, only perform every secondary part, as the heat is relatively at a great distance from the material instead of being in direct contact with it. They are generally heated merely to prevent them from cooling the apparatus or the material, but not with the view of obtaining from them any serious useful effect. This principle of heating a material in a state of division by means of a surface upon which it rests makes it necessary to cause the material to advance progressively and slowly in order that the time of contact be sufficiently long to allow of the heat passing from the heated surface into the material which is upon it. This is why all mechanical means employed for the purpose are caused to rotate slowly at a speed not exceeding a few revolutions, say from two to ten revolutions per minute, when a cylindrical apparatus with rotatory action is used. The parts which act on the material in the inside of the apparatus are always combined, so as to cause the material to advance, and generally also at the same time to stir and mix it up together. For this purpose the arrangement adopted consists nearly always of an endless screw or arms mounted helically round an axle, and the number of revolutions per minute to be performed by the screw or arms depends upon the inclination of the blades of the screw or of the arms which are to cause the material to move forward.

The length of the apparatus does not generally exceed five or ten times their diameter, and great care is taken to avoid a too rapid motion, which would project some of the material into the inner atmosphere of the apparatus and be considered as keeping it away from the action of the heat, and as causing it to be drawn away toward the outlet of the gases and vapors, when such are used, as in the present case. But under my present process the material to be heated does not rest upon a surface heated from underneath. It is constantly held in suspension in the internal atmosphere of the apparatus by being extraordinarily agitated, beaten, and projected in all directions; also, the material is not heated in a mass, as is the case in all other apparatus. It is heated nearly molecularly, every particle of the material being completely separated from its neighboring particles by a space, and being maintained free and in suspension in the gases and vapors within the apparatus; also, the material is not only efficiently heated by the under side of the apparatus; it is equally heated by the sides and top of the apparatus. Not only is every particle of the material constantly projected against all the heated surfaces of the apparatus, where they continually take up a fresh supply of heat, but the gases and vapors forming the internal atmosphere of the apparatus are projected in the same manner, and thus convey to every part of the apparatus the heat which has been taken up from the sides; also, the material does not move forward on a surface, it advances in an atmosphere. To fulfill all these conditions the acting parts must be made to rotate at a velocity which cannot be called merely a greater velocity than in other apparatus, but a velocity of an entirely different kind, not causing the material to progress forward, but producing the effect of a fan or whirlwind, and causing the material to be held in suspension in the atmosphere within the apparatus, as dust is held in the air by the action of a hurricane or a whirlwind. Instead of the rotation being from two to eight revolutions in applicant's apparatus, the parts must perform from fifty to one hundred revolutions, according to the diameters of the heated tubes.

Having fully described my invention, what I desire to claim and secure by Letters Patent is—

In the manufacture of ammonia-soda, the herein-described process of calcining bicarbonate of soda, consisting in violently agitating the bicarbonate of soda in the form of dust or powder in a heated decomposing or calcining apparatus, so as to cause the particles of soda to be projected in all directions within said apparatus, and thereby form a cloud of dust, the particles of which are brought into contact with every part of the inner heated wall of the apparatus.

ERNEST SOLVAY.

Witnesses:
ALFRED SOLVAY,
LOUIS LEMEB.